United States Patent [19]

Obara

[11] Patent Number: 4,733,041

[45] Date of Patent: Mar. 22, 1988

[54] WIRE CUT ELECTRIC DISCHARGE MACHINE

[75] Inventor: Haruki Obara, Sagamihara, Japan

[73] Assignee: Fanuc Ltd., Yamanashi, Japan

[21] Appl. No.: 19,273

[22] PCT Filed: Jun. 24, 1986

[86] PCT No.: PCT/JP86/00322

§ 371 Date: Mar. 16, 1987

§ 102(e) Date: Mar. 16, 1987

[87] PCT Pub. No.: WO87/00102

PCT Pub. Date: Jan. 15, 1987

[30] Foreign Application Priority Data

Jun. 25, 1985 [JP] Japan ................... 60-136945

[51] Int. Cl.⁴ ............................................. B23H 7/10
[52] U.S. Cl. .................... 219/69 W; 204/206; 219/69 D
[58] Field of Search ............... 219/69 D, 69 W, 69 R; 204/206, 224 M, 129.1

[56] References Cited

U.S. PATENT DOCUMENTS 4,495,393  5/1985  Janicke ............................. 219/69 D
4,634,825  1/1987  Budin et al. ...................... 204/206

FOREIGN PATENT DOCUMENTS 56-89437   7/1981  Japan .
184699    11/1982  Japan .

85/01907   5/1985  PCT Int'l Appl. ............. 219/69 D

Primary Examiner—A. D. Pellinen
Assistant Examiner—Geoffrey S. Evans
Attorney, Agent, or Firm—Armstrong, Nikaido, Marmelstein & Kubovcik

[57] ABSTRACT

A wire cut electric discharge machine having: a taper-machining table (6a) secured to the lower end of a vertical column (5a) disposed above a word table (T) capable of being moved in respective directions of an X-axis and a Y-axis perpendicularly intersecting each other in a horizontal plane and capable of being moved in respective directions of a U-axis and a V-axis perpendicularly intersecting each other in another horizontal plane parallel to the horizontal plane containing the X-axis and the Y-axis: a wire guide (7a) for guiding as wire electrode (9a), secured to the taper-machining table assembly (6a), and having a machining fluid spouting nozzle; and a cylinder member (24) fixed to arm (20), an elastic bag (28) contained in the cylindrical chamber (26) of the cylinder member (24), a plunger (30) vertically movably fitted in the cylindrical chamber (26), a roller (32) rotatably attached to the lower end of the plunger (30) and a branch pipe (34) which utilizes the pressure of a branch flow of the machining fluid supplied to the machining fluid spouting nozzle for applying a downward counterforce counteracting the reaction force of the spouting machining fluid to the taper-machining table assembly.

6 Claims, 4 Drawing Figures

WIRE CUT ELECTRIC DISCHARGE MACHINE

DESCRIPTION

1. Technical Field

The present invention relates to a wire cut electric discharge machine employing a wire electrode and, more particularly, to a wire cut electric discharge machine incorporating improvements in the capability of accurate high-speed electric discharge machining.

2. Background Art

In the electric discharge machining of a metallic work mounted on a work table capable of being moved in the respective directions of an X-axis and a Y-axis perpendicularly intersecting each other in a horizontal plane by means of the wire electrode, the wire cut electric discharge machine employing a wire electrode is constructed so as to feed the wire electrode along a vertical axis (Z-axis) via a pair of wire guides disposed above and below the work table, respectively, and to spout a machining fluid from the wire guides against a portion of the work being machined. In most cases, the upper wire guide is mounted on a taper-machining table assembly movably attached to the lower end of the vertical column of the electric discharge machine so as to be movable in a U-axis and a V-axis perpendicularly intersecting each other and extending in parallel to the X-axis and the Y-axis, respectively. In such an arrangement, since the taper-machining table assembly is movable structure, the upper wire guide inevitably tends to be slightly dislocated by the reaction force of the spouting machining fluid. This tendency is particularly remarkable in high-speed electric discharge machining because the machining fluid is spouted at a high pressure for such high-speed electric discharge machining. The dislocation of the wire guide results in a minute dislocation of the wire electrode from the correct position to which the wire electrode is adjusted before starting electric discharge machining, so that the locus of the wire electrode deviates from the normal machining locus, causing errors in the electric discharge machining.

DISCLOSURE OF THE INVENTION

Accordingly, an object of the present invention is to provide a wire cut electric discharge machine provided with means for correcting the dislocation of the wire guide to eliminate such errors in machining.

In view of the foregoing object of the invention, the present invention provides a wire cut electric discharge machine comprising a taper-machining table assembly attached to the lower end of a vertical column vertically extending above a work table capable of being moved in the respective directions of an X-axis and a Y-axis perpendicularly intersecting each other in a horizontal plane, the taper-machining table assembly being movable in the respective directions of a U-axis and a V-axis perpendicularly intersecting each other in another horizontal plane parallel to the horizontal plane containing the X-axis and the Y-axis, a wire guide attached to the taper-machining table assembly and having a machining fluid spouting nozzle, and balancing means for applying a downward force, to counteract the reaction force of the spouted machining fluid, to the taper-machining table assembly by utilizing the fluid pressure prevailing in a branch line branched from a line for supplying the machining fluid to the machining fluid spouting nozzle. Thus, a downward force of a magnitude appropriate to an exact correction of the dislocation of the wire guide attributable to the reaction force of the spouted machining fluid is applied to the table assembly for taper-machining.

BEST MODE FOR CARRYING OUT THE INVENTION

Figure 1:
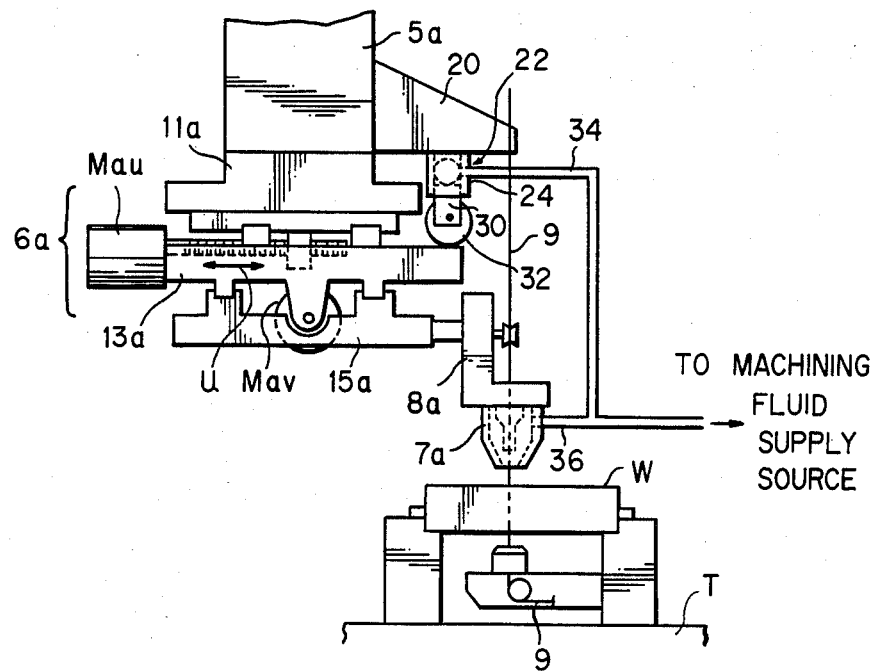
FIG. 1 is a front elevation of the essential portion of a wire cut electric discharge machine according to a first embodiment of the present invention.

First, the construction of the upper wire guide and the adjacent section of a conventional wire cut electric discharge machine shown in FIG. 4 will be described prior to the description of the preferred embodiments of the present invention. The wire cut electric discharge machine is provided with a vertical column 5 capable of being manually or automatically moved in vertical directions, and a taper-machining table assembly 6 which are attached to the lower end of the vertical column in a cantilever fashion 5. An upper wire guide 7 having an internal machining fluid spouting nozzle is attached through a bracket 8 to the table assembly 6 for taper-machining. A wire electrode 9 runs for carrying out electric discharge machining of a metallic work W via guide rollers 10 supported on the bracket 8 and other guide rollers from the upper wire guide 7 toward a lower wire guide (not seen) fixedly disposed below the metallic work W. As mentioned above, the metallic work W is mounted in place on a work table (not shown) capable of being moved in the respective directions of an X-axis and a Y-axis intersecting each other in a horizontal plane. The taper-machining table assembly 6 comprises a U-axis table 13 capable of being moved along guide rails 12 formed in the lower surface of a holding plate 11 fixed to the lower end of the vertical column 5 in the directions of a U-axis indicated by a double-head arrow U, and a V-axis table 15 capable of being moved along guide rails 14 formed in the lower surface of the U-axis table 13 in the directions of a V-axis indicated by a double-head arrow V. The U-axis table 13 is moved by a U-axis feed mechanism comprising a U-axis motor Mu fixedly mounted on the U-axis table 13, a rotation detector Du, and a feed screw mechanism including a ball screw 16, and the V-axis table 15 is moved in the directions of the V-axis by a V-axis feed screw mechanism comprising a V-axis motor Mv fixedly mounted on the V-axis table 15, a rotation detector Dv, and a feed screw mechanism (not shown). The taper-machining table assembly 6 is able to urge the vertically running wire electrode 9 to run along an inclined path past the bracket 8 and the upper wire guide 7 for taper-machining the work W by the displacement of the U-axis table 13 and the V-axis table 15.

During the electric discharge machining operation, a machining fluid F is spouted from the upper wire guide 7 and the lower wire guide against the wire electrode 9 and a portion of the work W being discharge machined, to promote the electric discharge machining effect, removed chips, and for cooling. In the recent high-speed electric discharge machining, the machining fluid is spouted at a high pressure on the order of several tens of atmospheric pressure. Accordingly, the influence of the reaction of the spouted machining fluid is exerted through the bracket 8 on the taper-machining table assembly 6. That is, since the taper-machining table assembly 6 includes movable components, namely, the U-axis table 13, the V-axis table 15, and the feed screw mechanisms, and is assembled in a cantilever construction, the components of the taper-machining table assembly 6 dislocated relative to each other by reaction to the spouted machining fluid; consequently, the bracket 8 and the upper guide 7 are dislocated from the respective correct positions, so that the wire electrode 9 deviates from the normal running path, deteriorating the machining accuracy.

A first embodiment of the present invention has been improved and contrived to eliminate the foregoing inconvenience will described hereinafter with reference to FIGS. 1 and 2.

Figure 2:
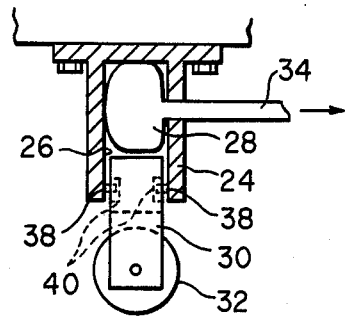
FIG. 2 is a sectional view showing the construction of the balancing means of the first embodiment shown in FIG. 1 in detail.
Figure 4:
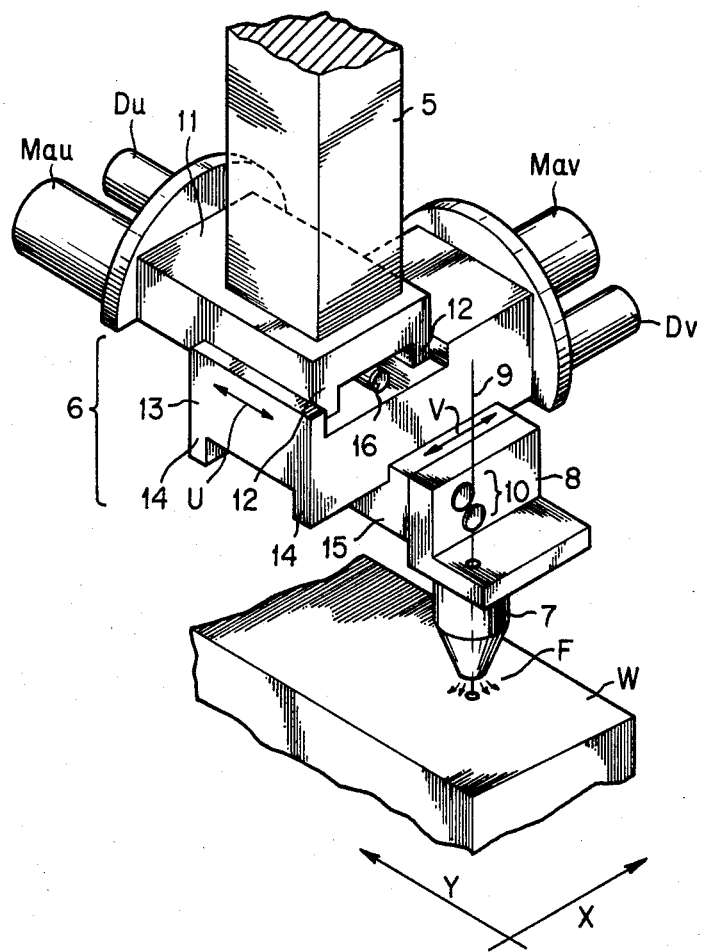
FIG. 4 is a perspective view showing the upper wire guide and the adjacent section of a wire cut electric discharge machine according to a prior art.

Referring to FIGS. 1 and 2, a wire cut electric discharge machine has a taper-machining table assembly 6a attached to a vertical column 5a (the longitudinal axis corresponds to a Z-axis.) disposed a above a work table T capable of being moved in the directions of an X-axis and a Y-axis perpendicularly intersecting each other, and an upper wire guide 7a held on a bracket 8a mounted on the taper-machining table assembly 6a which, basically, has the same constitution as the upper wire guide and the adjacent section of the conventional wire cut electric discharge machine shown in FIG. 4. The taper-machining table assembly 6a comprises a holding plate 11a secured to the lower end of the vertical column 5a, a U-axis table 13a capable of being moved in the directions of a U-axis relative to the holding plate 11a, and a V-axis table 15a capable of being moved in the directions of a V-axis perpendicular to the U-axis relative to the U-axis table 13a. The tables 13a and 15a are driven for movement by driving motors Mau and Mav, respectively. Naturally, feed screw mechanism and guiding means are provided for moving the U-axis table 13a and the V-axis table 15a, respectively, however, since the feed screw mechanisms and the guiding means are identical with those of the conventional wire cut electric discharge machine, the description thereof will be omitted.

Referring now to FIG. 1, an extremely rigid arm 20 is secured to the lower end of the vertical column 5a, and a balancing means 22 for applying a downward force to the taper-machining table assembly 6a subjected to the reaction of the spouted machining fluid is secured to the lower surface of the arm 20. In this embodiment, the balancing means 22 is intended to correct the deviation of the electrode wire from a normal running path through the U-axis table 13a, the V-axis table 15a, the bracket 8a, and the upper wire guide 7a by applying a downward counterforce corresponding to the reaction force of the spouted machining fluid to one end of the U-axis table 13a. As apparent from FIGS. 1 and 2, the balancing means 22 comprises a cylinder member 24 fixed to the arm 20, an elastic bag 28 contained in the cylindrical chamber 26 of the cylinder member 24, a plunger 30 vertically movably fitted in the cylindrical chamber 26, a roller 32 rotatably attached to the lower end of the plunger 30, and a branch pipe 34 for introducing the machining fluid into the bag 28. The branch pipe 34 is a line branched near a machining fluid spouting nozzle from a main supply line 36 for supplying the machining fluid from a machining fluid supply source to the machining fluid spouting nozzle. The roller 32 is provided so that the downward counterforce of the plunger 30 is applied always vertically downward to the U-axis table 13a which moves in the direction of the U-axis. Accordingly, the axis of rotation of the roller 32 is exactly perpendicular to the U-axis.

In the balancing means 22 thus constructed, when the machining fluid is supplied to the upper wire guide 7a and is spouted downward from the upper wire guide 7a against a portion of the work W being discharge machined by the wire electrode 9, part of the machining fluid is introduced through the branch pipe 34 into the elastic bag 28. That is, a branched flow of the machining fluid having a pressure substantially equal to that of the machining fluid supplied to the machining fluid spouting nozzle is introduced into and expands the elastic bag 28. Consequently, the plunger 30 is moved downward in the cylinder member 24 by a downward pressure, so that a downward counterforce is applied through the roller 32 to the U-axis table 13a. Thus, as mentioned above, the deviation of the wire electrode 9 from the normal running path can be corrected by applying the downward counterforce produced by utilizing the branched flow of the machining fluid as a power source and counteracting the reaction force of the spouting machining fluid acting through the wire guide 7a, the bracket 8a, and the taper-machining table assembly 6a on the U-axis table 13a. Pins 38 provided on the cylinder member 24 and received in grooves 40 formed in the plunger 30 retain the plunger 30 so as to be vertically movable within the cylinder member 24 and restrain the plunger 30 from falling off.

In the above-mentioned arrangement, the balancing means 22 applies a downward counterforce to one end of the U-axis table 13a of the taper-machining table assembly 6a, however, the component subjected directly to the reaction force of the spouted machining fluid is the wire guide 7a. In another embodiment of the present invention shown in FIG. 3, a downward counterforce is applied to the bracket 8a holding the wire guide 7a.

Figure 3:
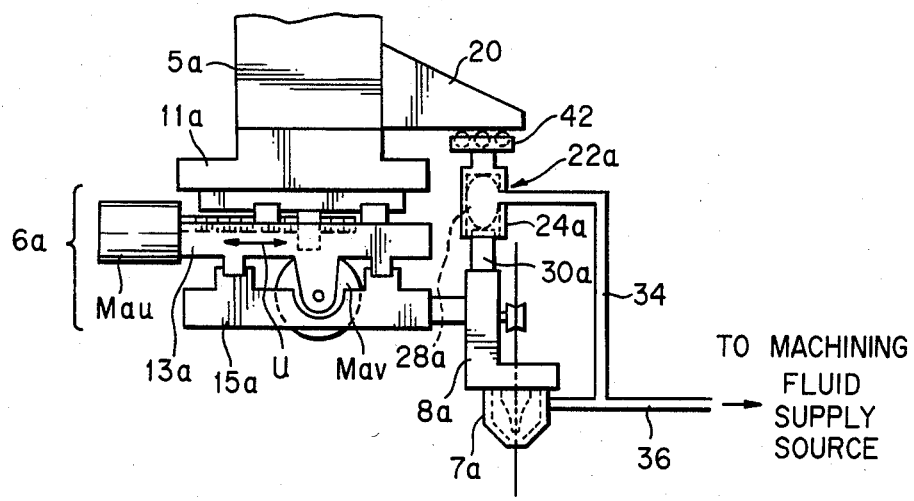
FIG. 3 is a front elevation of the essential portion of a wire cut electric discharge machine, in according to a second embodiment of the present invention.

In a balancing means 22a employed in the embodiment shown in FIG. 3, an elastic bag 28a is contained in a cylinder 24a, and a plunger 30a, which moves up or down according to the expansion and contraction of the elastic bag 28a, is fixed at the lower end thereof to the top of the bracket 8a. A rolling unit 42 formed of bearing means is provided on the upper end of the cylinder 24a so as to be in rolling contact with and movable along the lower surface of the arm 20. Accordingly, similar to the foregoing embodiment, this embodiment is capable of directly applying downward counterforce corresponding to and counteracting the reaction force of the spouted machining fluid through the bracket 8a to the upper wire guide 7a by means of the plunger 30a by introducing a branch flow of the machining fluid through the branch pipe 34 into the elastic bag 28a to expand the same. Thus, the deviation of the wire electrode 9 from the normal running path can be corrected.

Although two embodiments of the present invention have been described hereinbefore, essentially, the present invention has been made in view of an inconvenience whereby an electrode wire correctly located before starting the electric discharge machining is forced to deviate from the normal running path by the reaction force of the spouted machining fluid acting on the upper wire guide of the wire cut electric discharge machine having the taper-machining table assembly 6a comprising movable components, and hence difficult to be formed in a highly rigid construction, and the present invention corrects the deviation of the wire electrode from the normal running path by applying a downward counterforce counteracting the reaction force on the upper wire guide. Accordingly, the present invention is not limited in its practical application to the foregoing embodiments; for example, the upward dislocation of the upper wire guide caused by the reaction force of the spouted machining fluid may be compensated by attaching the holding plate 11a to the lower end of the vertical column 51 with an elastic member therebetween and displacing the taper-machining table assembly including the holding plate downward against the resilient resistance of the elastic member by a downward counterforce applied to the holding plate.

As apparent from the foregoing description, according to the present invention, even if the pressure for spouting the machining fluid is increased to a high level to comply with the high-speed electric discharge machining operation of the wire cut electric discharge machine, necessarily entailing the deviation of the wire electrode which has been positioned previously before starting the electric discharge machining operation from the normal running path due to the dislocation of the wire guide and the taper-machining table assembly by the reaction force of the spouted machining fluid, the deviation of the wire electrode from the normal running path can be corrected by applying a downward counterforce counteracting the reaction force on the wire guide of the taper-machining table assembly, so that the wire electrode is able to run along the normal running path for the electric discharge machining of the work. Consequently, the wire cut electric discharge machining is achieved at a high machining accuracy corresponding to the accuracy of feeding the work by the work table in the directions of the X-axis and the Y-axis. Naturally, the diameter of the plunger and the dimensions of the related parts are designed selectively so that an appropriate downward counterforce is produced.

I claim:

1. A wire cut electric discharge machine comprising: a work table for supporting a work, capable of being moved in respective directions of an X-axis and a Y-axis perpendicularly intersecting each other in a horizontal plane; a vertical column disposed above said work table; a taper-machining table assembly secured to a lower end of said vertical column and capable of being moved in respective directions of a U-axis and a V-axis parallel to the X-axis and the Y-axis, respectively, and perpendicularly intersecting each other; a wire guide for guiding a wire electrode, secured to said taper-machining table assembly and having a machining fluid spouting nozzle; a machining fluid supply source; and balancing means which utilizes a pressure of a branch flow of a machining fluid supplied from said machining fluid supply source to said machining fluid spouting nozzle of said wire guide for applying a downward counterforce counteracting a reaction force of spouting of said machining fluid on the taper-machining table assembly to restrain said taper-machining table assembly and said wire guide from dislocation.

2. A wire cut electric discharge machine according to claim 1, wherein said balancing means comprises: a cylinder containing an elastic bag which receives a branch flow of said machining fluid, and a plunger vertically movably supported within said cylinder, and roller means provided on a lower end of said plunger engages said taper-machining table assembly.

3. A wire cut electric discharge machine according to claim 1, wherein said cylinder is secured to an arm extending from said vertical column.

4. A wire cut electric discharge machine according to claim 1, wherein said balancing means comprises: a cylinder containing an elastic bag which receives a branch flow of said machining fluid, and a plunger vertically movably supported within said cylinder, said cylinder slidably engages an arm projecting from said vertical column at an upper end thereof, and a lower end of said plunger is in contact with said taper-machining table assembly.

5. A wire cut electric discharge machine according to claim 1, wherein said elastic bag is made of material capable of expanding and contracting.

6. A wire cut electric discharge machine according to claim 1, wherein said plunger is provided with vertical grooves which receives pins projecting from an inner surface of said cylinder to retain said plunger within said cylinder, respectively.

* * * * *

UNITED STATES PATENT AND TRADEMARK OFFICE
CERTIFICATE OF CORRECTION

PATENT NO.   :   4,733,041
DATED        :   March 22, 1988
INVENTOR(S)  :   Haruki OBARA It is certified that error appears in the above-identified patent and that said Letters Patent is hereby corrected as shown below:

On the cover page, Item [57] in the Abstract, line 3, "word table" should read --work table--; and line 10, "as wire" should read --a wire--.

Signed and Sealed this

Sixth Day of September, 1988

Attest:

DONALD J. QUIGG

Attesting Officer

Commissioner of Patents and Trademarks